United States Patent
Willis et al.

(10) Patent No.: US 7,909,538 B2
(45) Date of Patent: Mar. 22, 2011

(54) PIPE LAYING VESSEL AND METHODS OF OPERATION THEREOF

(75) Inventors: Stewart Kenyon Willis, Aberdeenshire (GB); Alan William Henry West, Aberdeen (GB)

(73) Assignee: Acergy UK Limited, Aberdeen (GB)

( * ) Notice: Subject to any disclaimer, the term of this patent is extended or adjusted under 35 U.S.C. 154(b) by 241 days.

(21) Appl. No.: 11/922,946

(22) PCT Filed: Jun. 29, 2006

(86) PCT No.: PCT/GB2006/002415
§ 371 (c)(1),
(2), (4) Date: Nov. 14, 2008

(87) PCT Pub. No.: WO2007/000609
PCT Pub. Date: Jan. 4, 2007

(65) Prior Publication Data
US 2010/0021237 A1 Jan. 28, 2010

(30) Foreign Application Priority Data

Jun. 29, 2005 (GB) .................................. 0513250.1

(51) Int. Cl.
*F16L 1/18* (2006.01)
(52) U.S. Cl. ....................... 405/168.4; 405/166; 405/170
(58) Field of Classification Search ................... 405/158, 405/166, 168.1, 168.2, 168.3, 168.4, 169, 405/170, 173
See application file for complete search history.

(56) References Cited

U.S. PATENT DOCUMENTS

| | | | | |
|---|---|---|---|---|
| 3,431,739 A | * | 3/1969 | Richardson et al. | 405/169 |
| 3,472,035 A | * | 10/1969 | Broussard et al. | 405/167 |
| 3,545,663 A | | 12/1970 | Bloemhard | |

(Continued)

FOREIGN PATENT DOCUMENTS

EP    1063163    12/2000

(Continued)

OTHER PUBLICATIONS

Gifford L: "S-lay vessels can be converted to install Oman-India pipeline" Offshore, Pennwell, Tulsa, OK vol. 55, No. 6, Jun. 1, 1995 pp. 45-46 www.offshore-mag.com/articles/print_screen.cfm?ARTICLE_ID+23248.

*Primary Examiner* — Frederick L Lagman

(57) ABSTRACT

A pipelaying vessel comprises storage (502) for a number of pipe units to be assembled into a pipeline and S-lay apparatus (312, 314, 316) for fabricating and paying out of a pipeline by repeated addition of new sections (506). The end of said pipeline being laid is held aligned with a fabrication axis closer to horizontal than vertical, the S-lay apparatus including a stinger (312) for supporting the pipeline in an arcuate path to a departure axis which is more vertical than horizontal. Auxiliary apparatus (318/810) is provided for use in fitting singular items to one end of the pipeline. The supporting structure (320/802) of said auxiliary apparatus is located above a lower end of the stinger of the S-lay apparatus, substantially aligned with said departure axis, so as to facilitate handing over of the suspended pipeline and singular item from one of said apparatuses to the other. The auxiliary apparatus may be an A-frame (810) or a complete J-Lay apparatus (318-322) for additional laying tasks. The fabrication axis may be located above and to one side of the main deck, permitting a large radius stinger to be carried. The vessel and/or its design may be adapted from a standard container vessel.

73 Claims, 4 Drawing Sheets

U.S. PATENT DOCUMENTS

| | | | |
|---|---|---|---|
| 3,685,305 A | 8/1972 | Lloyd, III | |
| 3,822,559 A * | 7/1974 | Matthews et al. | 405/166 |
| 4,030,311 A * | 6/1977 | Rafferty | 405/166 |
| 4,073,156 A * | 2/1978 | Smith | 405/170 |
| RE29,591 E * | 3/1978 | Lloyd | 405/166 |
| 4,153,381 A * | 5/1979 | Hawley | 405/173 |
| 4,493,590 A * | 1/1985 | Ayers et al. | 405/170 |
| 5,011,333 A | 4/1991 | Lanan | |
| 5,413,434 A * | 5/1995 | Stenfert et al. | 405/166 |
| 5,421,675 A | 6/1995 | Brown et al. | |
| 5,449,252 A * | 9/1995 | Maloberti et al. | 405/166 |
| 5,464,307 A * | 11/1995 | Wilkins | 405/166 |
| 5,836,719 A | 11/1998 | Martin et al. | |
| 5,971,666 A * | 10/1999 | Martin et al. | 405/168.1 |
| 5,975,802 A * | 11/1999 | Willis | 405/166 |
| 6,004,071 A * | 12/1999 | Broeder et al. | 405/166 |
| 6,213,686 B1 | 4/2001 | Baugh | |
| 6,226,855 B1 | 5/2001 | Maine | |
| 6,328,502 B1 * | 12/2001 | Hickey et al. | 405/168.3 |
| 6,361,250 B1 | 3/2002 | de Varax | |
| 6,371,694 B1 | 4/2002 | de Varax et al. | |
| 6,398,457 B2 * | 6/2002 | Baugh | 405/170 |
| 6,524,030 B1 * | 2/2003 | Giovannini et al. | 405/166 |
| 6,551,027 B2 | 4/2003 | Willis et al. | |
| 6,729,802 B2 * | 5/2004 | Giovannini et al. | 405/158 |
| 6,733,208 B2 * | 5/2004 | Stockstill | 405/169 |
| 6,776,560 B2 * | 8/2004 | Moszkowski et al. | 405/166 |
| 2001/0033773 A1 * | 10/2001 | Baugh | 405/166 |
| 2002/0009333 A1 | 1/2002 | Willis et al. | |
| 2003/0099515 A1 * | 5/2003 | Giovannini et al. | 405/158 |
| 2005/0265788 A1 * | 12/2005 | Renkema | 405/158 |

FOREIGN PATENT DOCUMENTS

| | | |
|---|---|---|
| EP | 1217276 | 6/2002 |
| GB | 2302157 | 3/1995 |
| GB | 2299646 | 10/1996 |
| GB | 2324078 | 10/1998 |
| WO | WO 96/27751 | 9/1996 |
| WO | WO 00/05525 | 2/2000 |
| WO | WO 03/004915 | 1/2003 |
| WO | WO 2004/015321 | 2/2004 |
| WO | WO 2004/072529 | 8/2004 |
| WO | WO 2004/085898 | 10/2004 |

* cited by examiner

PIPE LAYING VESSEL AND METHODS OF OPERATION THEREOF

CROSS REFERENCE TO RELATED APPLICATION

This application claims the priority of GB 0513250.1 filed on 29 Jun. 2005, the disclosure of which is incorporated herein by reference for all purposes.

The invention relates to a vessel for laying pipe at sea, and in particular to a vessel of the type in which a long pipeline is fabricated on board during laying, rather than the type which lays a length of pipe which has been prefabricated and stored on a reel.

FIGS. 1 and 2 illustrate respectively the 'Steep S-lay' and 'J-lay' types of system which are known for fabricating and laying pipelines in very deep water. Each will be described in more detail below. Each system takes it name from the 'S' or 'J' shape formed by the pipe from the point where it is fabricated on the vessel, through the catenary curve it follows to the point where it lies, horizontal on the seabed.

Steep S-lay systems are a relatively recent development of S-lay systems used traditionally in shallower water. One well-known example is Allseas' vessel Solitaire, of the form generally shown in GB 2299646A (Allseas/Kalkman). Steep S-lay systems lay pipe very rapidly, but have the disadvantage that they yield the outer 'fibres' of the pipe during passage over the stinger and are difficult for the fitting of end terminations (known as PLETs) and midline tees. Although pipeline production aboard such a vessel is in principle very efficient, the attachment of structures and tees to the suspended pipe catenary is very time-consuming, and can typically take 6 to 12 hours. Frequently, such operations can only be performed by laying the pipeline down on the seabed, and hauling it up again to another apparatus at a different position on the vessel, or even a completely different vessel. During this time pipeline production is halted.

Examples of J-lay systems are known from U.S. Pat. No. 6,213,686 (Baugh), U.S. Pat. No. 6,361,250 (de Varax), U.S. Pat. No. 6,371,694 (corresponding to vessel CSO Deep Blue), U.S. Pat. No. 5,421,675 (Brown/McDermott) and WO00005525A2 (Saipem 7000). J-lay systems are very slow unless they are extremely tall, say 75 m to 100 m or more, which limits their application to heavy crane vessels such as Saipem 7000. However, they have the advantage of minimising the fatigue loading applied to the catenary during installation and are therefore preferred for laying steel catenary risers (SCRs) which are sensitive to fatigue in the sag bend (where the pipe touches down on the seabed) and at the platform hang-off. J-lay systems are also better suited for the insertion of in-line modules and end terminations, which is performed either within the J-lay system itself or in adjacent PLET-handling apparatus.

Each of the two systems mentioned therefore has its own advantages and disadvantages making it suitable for different types of project. Accordingly, a single oilfield construction project may require two different pipelay vessels, each in itself a very expensive asset, to be provided and co-ordinated in their availability and operations, to perform different parts of the installation. The vessels may even belong to different contractors, increasing the contractual complexities and commercial risk for all involved.

To complicate matters further, plastic lining of pipelines is an increasing feature of pipeline construction projects. Because of the complexity of joining lengths of plastic-lined pipe, compared with simple steel-steel pipe welds, lining becomes uneconomic and incurs increased lifetime risk as the length of pre-lined pipe to be welded to the catenary reduces. Consequently, it is currently uneconomic to lay lined pipe using J-lay systems and never attempted using S-lay systems. Despite the proposal of simpler methods of joining lined pipes such as are disclosed in WO 2004/015321A (Stolt) and U.S. Pat. No. 6,226,855 (Lattice) lined pipe remains almost exclusively the territory of Reel-Lay systems, where 500 m to 1 km stalks are lined onshore and welded onto the pipeline during reeling.

Additionally, as the area of deep water operations has extended from the North Sea to include the Gulf of Mexico, West Africa, Brazil, and the Eastern Mediterranean, suitably equipped ships are having to spend increasing proportions of their time carrying the products that they are to deploy from the manufacturer's quayside to the work site. This is extremely inefficient, as the current generation of ships is optimised for remaining in a fixed position on dynamic positioning (DP) and extremely slow in transit. Known vessels simply do not have the space or load capacity to carry all their pipe stalk for a season on one journey.

The present invention aims to enable pipe laying operations from a single vessel without the compromises inherent in the known technologies described above. Various independent aspects of the invention are disclosed, which each address one or more of the drawbacks identified above. These aspects can be used separately or in combination in a given vessel.

[First Aspect]

According to a first aspect of the invention there is provided a pipelaying vessel comprising:
- storage for a number of pipe units to be assembled into a pipeline for laying;
- S-lay apparatus for fabricating and paying out of a pipeline by repeated addition of new pipeline sections to the end of the pipeline being laid, the end of said pipeline being held aligned with a fabrication axis closer to horizontal than vertical, the S-lay apparatus including a stinger for supporting the fabricated pipeline in an arcuate path between said fabrication axis and a departure axis which is substantially vertical; and
- auxiliary apparatus for use in fitting singular items to at least one end of the pipeline and including a supporting structure for supporting said items while they are connected to the pipeline wherein the supporting structure of said auxiliary apparatus is located above a lower end of the stinger of the S-lay apparatus, substantially aligned with said departure axis, so as to facilitate handing over of the suspended pipeline and singular item from one of said apparatuses to the other.

This facility allows the bulk of a pipeline to be rapidly laid by the S-lay system, while singular features which can not pass over the stinger supporting the pipeline over said arcuate path, can be installed by the auxiliary apparatus without cumbersome hand-over procedures, and without changing the vessel position.

The vessel may further comprise:
- J-lay apparatus for fabricating and paying out of a pipeline by repeated addition of new pipeline sections to the end of the pipeline being laid, the end of said pipeline in operation being held at a lower end of the J-lay apparatus and having a departure angle aligned with a substantially vertical axis of the J-lay apparatus; and
- means for handing the suspended pipeline over from one of said apparatus to the other such that different parts of the same pipeline can be fabricated by the different J-lay and S-lay apparatuses.

It will be understood that 'vertical' in this specification includes a range of angles that may be necessary to align with the natural catenary path of the suspended pipeline. This is because a horizontal element of tension is needed to avoid damaging the pipe where it touches down on the seabed.

The new pipeline sections added need not be the same length in the different apparatuses, and in any case they may change according to the nature of the product being handled. Moreover, particularly in the case of the J-lay apparatus, the new pipeline section may on occasion be a Tee-piece or other singular piece of equipment, instead of simple pipe.

In one embodiment, the J-lay apparatus and said S-lay apparatus are simply mounted on the vessel such that the stinger is within the length of the vessel and the departure axis of the S-lay system and the axis of the J-lay apparatus are substantially aligned, the J-lay apparatus thus forming said auxiliary apparatus. The means for handing over in that case can be implemented by one or more winches and cables to support the weight of the suspended pipeline while it is released by one of the apparatuses and taken up by the other. Having the stinger within the length of the vessel also facilitates hand-over of the pipeline to another vessel or platform— for example handing over a riser to an FPSO (floating production, storage and offloading vessel).

In alternative embodiments, the hand-over means may be adapted for translating the end of the suspended pipeline between the axis of the J-lay apparatus and the departure axis of the S-lay apparatus. In WO 2004/085898, for example (Stolt Offshore, Agent's ref 64086WO) the hold-off clamp of a J-lay apparatus is supported on a carriage so as to be translatable to working positions off the J-lay axis. In another prior example WO 03004915A1 (Torch Offshore), the entire j-lay apparatus is translatable on the vessel. Such arrangements, although more costly in themselves, may have merit if it is not easy to align the axes of the two apparatuses directly.

In a typical embodiment, the J-lay apparatus comprises:
means for suspending a pipeline being laid with a substantially vertical departure angle;
means for erecting and holding a new pipeline section in alignment with the suspended pipeline;
means for joining the erected pipeline section to the suspended pipeline so as to extend the pipeline being laid; and
means for lowering the extended pipeline to be held in said suspending means ready for addition of a further pipeline section.

The J-lay apparatus may in particular comprise a tower structure aligned with the axis, a working table located at the foot of said tower and an erector for receiving a pipeline section to be added to the pipeline and supporting the pipeline section while moving it from a horizontal receiving position to a vertical position within the tower. The tower may be tiltable from vertical as described in the various known J-lay systems descriptions referenced above.

The J-lay apparatus may further include a production line for assembling said new pipeline section from shorter pipe units held in said storage, prior to erecting them in the J-lay apparatus. Alternatively, the pipe units from the storage may be used directly as said pipeline sections.

In an alternative embodiment, with or without J-lay apparatus, said auxiliary apparatus may comprise a hold-off clamp substantially aligned with said departure axis for holding an upper end of a pipeline already laid and a module-handling apparatus above the hold-off clamp for supporting an end termination module in vertical alignment with the end of the pipeline while the pipeline and module are joined.

The module-handling apparatus may include a fixed supporting structure and an A-frame structure pivotally mounted to said fixed structure, the A-frame structure providing a support which is movable fore and aft across the departure axis while supporting the weight of said module and pipeline.

Said module-handling apparatus may further be located substantially at the intersection of the departure axis and fabrication axis of the S-lay system, and may include a structure for supporting a second end termination module in relatively horizontal alignment with the end of a pipeline being fabricated while the said module and pipeline are joined.

In a typical embodiment, the S-lay apparatus comprises, in addition to the stinger:
tensioning means aligned with said fabrication axis upstream of the stinger for gripping and controlling the paying out of the pipeline under tension;
one or more joining stations positioned along the fabrication axis upstream of the tensioning means for joining new sections of pipe to the end of the pipeline held in the tensioning means.

The apparatus may further include a substantially fixed clamp positioned on the fabrication axis between the stinger and the primary joining station, for holding the end of the pipeline while the new pipeline section is added to the pipeline, the tensioning means being located upstream of the primary joining station, for paying out the pipeline by gripping the newly added pipeline section. Such an arrangement maximises the length of pipeline section that can be added, for a given length of apparatus.

The tensioning means may comprise at least one travelling clamp mounted on a carriage and means for driving the carriage along the fabrication axis while gripping the pipeline.

The tensioning means may alternatively comprise a series of track-type tensioners, or a combination of fixed clamps, travelling clamps and track tensioners.

The S-lay apparatus may comprise a series of joining stations spaced along the fabrication axis and operable to process a number of joints in parallel.

The S-lay apparatus may additionally or alternatively comprise a pipeline factory located off said fabrication axis, the pipeline factory having a plurality of work stations arranged in at least one multi-stage production line for pre-assembling pipeline sections from shorter units held in said storage, and means for transferring the assembled pipeline sections from the production line to the fabrication axis for joining to the pipeline being laid. By this means, a high lay rate can be achieved with fewer joining stations being located on the fabrication axis itself.

The S-lay apparatus may further include means for lining the assembled pipeline section with a continuous plastic liner, the joining station being adapted for joining the pipeline section and its lining to the pipeline being laid and a lining thereof, respectively.

Where a long vessel is used, the pipeline factory may be adapted to form pipeline sections greater than 90 m, even 135 m or 180 m long, such that the lay rate can be maximised, and even lined pipe can be economically fabricated at sea. These lengths correspond to 8-11, 12-15 or 16+ pipe units of approximately 12 m each.

The pipeline factory may further comprise a second multi-stage production line, also located off said fabrication axis, said transferring means being operable to transfer assembled pipeline sections alternately from said first and second production lines to achieve a greater rate of laying than would be achievable by the first pipeline section factory alone.

In the preferred embodiment, the S-lay apparatus is positioned with its fabrication axis outboard along one side of the vessel. In this way an existing vessel design such as a container carrier can be adapted into a pipelay vessel according to the invention, without deviating from a hull form which is efficient in transit over long distances.

The S-lay apparatus in the preferred embodiment is also positioned with its fabrication axis at a height of 10 m, 20 m or more above a main deck of the vessel. This reduces the depth below the water occupied by the stinger and raises the point of departure of the pipeline closer to the working level of the J-lay apparatus.

The transferring means may include an elevator for lifting the fabricated pipeline section from the level of said production line to the height of the fabrication axis.

In the preferred embodiment, a lower part of the stinger is foldable upward when not in use.

The S-lay apparatus may further comprise a second stinger for supporting a second portion of fabricated pipeline in a second arcuate path, said second arcuate path running in a direction opposite to that of the first-mentioned arcuate path to a second departure axis which is substantially vertical but distant from the first departure axis. By this feature, set out more particularly as a third aspect of the invention below, pipeline fabrication can continue, paying out the pipeline into the sea over the second stinger, while paying out along the first arcuate path is halted for J-lay operations or other reasons.

The S-lay apparatus may comprise a (further) substantially fixed clamp located on the fabrication axis close to the second stinger for holding an end of the second fabricated pipeline in alignment with the fabrication axis while the remainder of the second fabricated pipeline extends over the second stinger.

The S-lay apparatus may comprise an additional joining station located on the fabrication axis closer to the second stinger than to the first stinger, for joining a new pipeline section to the end of the second fabricated pipeline while the remainder of the second fabricated pipeline extends over the second stinger.

Where the tensioning means comprises at least one travelling clamp mounted on a carriage and means for driving the carriage along the fabrication axis between the first and second stingers, the clamp may be operable for gripping and controlling paying out of a pipeline section along either of the first and second arcuate paths. Alternatively, separate tensioning means can be provided for the first and second pipelines.

A lower part of the second stinger may be foldable upward when not in use.

The storage may comprise a containerised hold of the vessel, in the manner described in our earlier application GB 2324078A.

The vessel may be a container carrier of at least 6000 TEU, preferably over 8000 TEU cargo capacity and/or at least 200 m, possibly over 300 meters length overall (TEU is a standard measure of container cargo capacity, standing for Twenty-foot Equivalent Units).

The invention in the first aspect further provides a method of fabricating and laying a pipeline from a vessel at sea, the method comprising the steps:
(a) storing on the vessel pipe units to be assembled into a pipeline for laying;
(b) fabricating and paying out a J-lay part of a pipeline by addition of one or more new pipeline sections to the end of the pipeline being laid, the end of said pipeline in this step being held at a lower end of a J-lay apparatus mounted on the vessel and having a departure angle aligned with a substantially vertical axis of the J-lay apparatus;
(c) before or after step (b), fabricating and paying out an S-lay part of the same pipeline by repeated addition of new pipeline sections to the end of the pipeline being laid, the end of said pipeline in this step being held in an S-lay apparatus also mounted on the vessel and aligned with a fabrication axis closer to horizontal than vertical, the fabricated pipeline being supported by a stinger of the S-lay apparatus over an arcuate path between said fabrication axis and a departure axis which is substantially vertical; and
(d) handing the suspended pipeline over from one of said apparatus to the other for fabrication of the different parts of the pipeline.

The S-lay part of the pipeline may comprise a flowline laid to lie completely on the seabed, while the J-lay part forms a riser extending from the seabed toward the surface.

The S-lay part of the pipeline may comprise a continuous pipeline while the J-lay part includes singular features (for example a midline Tee or end termination).

The method may further comprise fabricating a new section for addition to the J-lay part of the pipeline in step (b) by joining together two or more of said pipe units from the storage.

The method may further comprise fabricating a new section for addition to the S-lay part of the pipeline in step (c) by joining together two or more of said pipe units from the storage.

The fabrication of the new section may be performed using a first production line while a previous new section fabricated on a second, parallel production line is being joined to the pipeline in step (c).

The new sections added in step (c) may be several times the length of the section(s) added in step (b).

The method may further include inserting a plastic lining into each new section prior to its being added, step (c) including joining the lining of the new section to a lining within the pipeline being laid.

The method may further include the step (e) of fabricating and paying out into the sea a second pipeline by repeated addition of new pipeline sections to the end of the second pipeline, the end of said pipeline in this step being held in the S-lay apparatus and aligned with the fabrication axis, the second pipeline being supported by a second stinger over a second arcuate path between said fabrication axis and a departure axis which is substantially vertical so as to be paid out in the opposite direction from the first mentioned pipeline.

The step (e) may be performed simultaneously with step (b) so as to build up a stalk of fabricated pipeline hanging from the second stinger, the second pipeline being joined to the first-mentioned pipeline after transferring the first-mentioned pipeline back into the S-lay apparatus and paid out over the first-mentioned stinger prior to resuming step (c).

In the storing step more than a thousand pipe units may be stored, for example in containerised storage.

The invention in the first aspect yet further provides a method of fabricating and laying a pipeline from a vessel at sea, the method comprising the steps:
(a) storing on the vessel pipe units to be assembled into a pipeline for laying;
(b) fabricating and paying out an S-lay part of the same pipeline by repeated addition of new pipeline sections to the end of the pipeline being laid, the end of said pipeline in this step being held in an S-lay apparatus also mounted on the vessel and aligned with a fabrication axis closer to horizontal than vertical, the fabricated pipeline being supported by a stinger of the S-lay apparatus over an arcuate path between said fabrication axis and a departure axis which is substantially vertical;

(d) handing the suspended pipeline over from said S-lay apparatus to a hold-off clamp mounted in a supporting structure above a lower end of the stinger of the S-lay apparatus, the hold-off clamp being substantially aligned with said departure axis;

(e) fitting a terminating module to the upper end of the pipeline using said supporting structure for supporting said module while it is connected to the pipeline held in said hold-off clamp; and (f) abandoning the connected pipeline and module by paying them out substantially vertically from said supporting structure.

The invention in the first aspect yet further provides a method of fabricating and laying a pipeline from a vessel at sea, the method comprising the steps:

(a) storing on the vessel pipe units to be assembled into a pipeline for laying;

(b) fabricating and paying out an S-lay part of the same pipeline by repeated addition of new pipeline sections to the end of the pipeline being laid, the end of said pipeline in this step being held in an S-lay apparatus also mounted on the vessel and aligned with a fabrication axis closer to horizontal than vertical, the fabricated pipeline being supported by a stinger of the S-lay apparatus over an arcuate path between said fabrication axis and a departure axis which is substantially vertical;

(d) prior to step (b), feeding the end of a first pipeline section from said S-lay apparatus to a location where a terminating module is supported by supporting structure above a lower end of the stinger of the S-lay apparatus, the module being substantially aligned with said fabrication axis;

(e) connecting the terminating module to the end of the pipeline section; and (f) lowering the connected terminating module from the supporting structure while paying out the pipeline until the terminating module passes clear of the stinger, the pipeline being progressively supported by said stinger ready for fabrication and paying out to commence according to step (b).

[Second Aspect]

The invention in a second aspect provide a pipelaying vessel including apparatus for fabrication and paying out of a pipeline being laid, the apparatus having a fabrication axis extending substantially horizontally along the vessel, comprising:

storage for a number of pipe units to be assembled into a pipeline for laying;

a stinger for supporting the pipeline in an arcuate path between the fabrication axis and a departure axis which is substantially vertical or at least inclined greater than 45 degrees from horizontal;

tensioning means positioned around the fabrication axis upstream of the stinger, for gripping and controlling the paying out of the pipeline under tension;

a primary joining station positioned on the fabrication axis upstream of the tensioning means for joining new pipeline sections to the end of the pipeline held in the tensioning means;

a pipeline factory located off said fabrication axis, the pipeline factory having a plurality of work stations arranged in at least one production line for pre-assembling pipeline sections from shorter units held in said storage; and means for transferring the assembled pipeline sections from the production line to the fabrication axis for joining to the pipeline being laid at said primary joining station.

The apparatus may further include a substantially fixed clamp positioned on the fabrication axis between the stinger and the primary joining station, for holding the end of the pipeline while the new pipeline section is added to the pipeline, the tensioning means being located upstream of the primary joining station, for paying out the pipeline by gripping the newly added pipeline section. Such an arrangement maximises the length of pipeline section that can be added, for a given length of apparatus.

The tensioning means may comprise at least one travelling clamp mounted on a carriage and means for driving the carriage along the fabrication axis while gripping the pipeline.

The tensioning means may alternatively comprise a series of track-type tensioners, or a combination of fixed clamps, travelling clamps and track tensioners.

The apparatus may further include means for lining each assembled pipeline section with a continuous plastic liner prior to joining the pipeline section to the pipeline, the primary joining station being adapted for joining the pipeline section and its lining to the pipeline being laid and a lining thereof, respectively.

Where a long vessel is used, the pipeline factory may be adapted to form pipeline sections greater than 90 m, even 135 m or 180 m long. The length of the pipeline sections may in particular be greater than half the overall length of the vessel. An arrangement which achieves this length within a conventional cargo ship design is one in which said storage is accessed at one side of the vessel (e.g. port side) and said pipeline factory and fabrication axis are together located at the other side of the vessel, pipe sections being transferred from one side of the vessel to the other before being assembled into said pipeline sections, for example in single or double joints. Transferring the pipe from port to starboard (or vice versa) in shorter lengths allows them to pass in front of or behind a superstructure of the vessel.

The pipeline factory may further comprise a further plurality of work stations arranged in a second multi-stage production line, also located off said fabrication axis, said transferring means being operable to transfer assembled pipeline sections alternately from said first and second production lines to achieve a greater rate of laying than would be achievable by the first pipeline section production line alone.

The apparatus may be positioned with its fabrication axis outboard along one side of the vessel.

The apparatus may alternatively or in addition be positioned with its fabrication axis at above a main deck of the vessel, for example by a height of 10 m, 20 m or more. This allows the stinger to have a large radius without being largely located below the water line.

The transferring means may include an elevator for lifting the fabricated pipeline section from the level of said production line to the height of the fabrication axis.

The radius of curvature of the stinger preferably exceeds 30 m, 50 m or even 60 m to avoid plastic bending on a reasonable range of pipe diameters. Raising the fabrication axis above the deck level allows this to be achieved with only a minor part of the stinger depending into the water during operations.

A lower part of the stinger may be foldable upward when not in use.

The apparatus may further comprise a second stinger for supporting a second fabricated pipeline in a second arcuate path, said second arcuate path running in a direction opposite to that of the first-mentioned arcuate path to a second departure axis which is substantially vertical but distant from the first departure axis.

The apparatus may comprise a (further) substantially fixed clamp located on the fabrication axis close to the second stinger for holding an end of the second fabricated pipeline in alignment with the fabrication axis while the remainder of the second fabricated pipeline extends over the second stinger.

The apparatus may comprise a further joining station located on the fabrication axis closer to the second stinger than to the first stinger, for joining a new pipeline section to the end of the second fabricated pipeline while the remainder of the second fabricated pipeline extends over the second stinger.

Where the tensioning means comprises at least one travelling clamp mounted on a carriage and means for driving the carriage along the fabrication axis between the first and second stingers, the same clamp may being operable for gripping and controlling paying out of a pipeline section along either of the first and second arcuate paths. Alternatively, separate tensioning means can be provided for the first and second pipelines.

A lower part of the second stinger may be foldable upward when not in use.

The storage may comprise a containerised hold of the vessel. The vessel may be a container carrier of at least 6000 TEU, preferably over 8000 TEU cargo capacity and/or at least 200 m, possibly over 300 meters length overall (TEU is a standard measure of container cargo capacity, standing for Twenty-foot Equivalent Units).

The invention in the third aspect further provides a method of fabrication and paying out of a pipeline, the method comprising:
- storing a number of pipe units to be assembled into a pipeline for laying;
- supporting the pipeline in an arcuate path between the fabrication axis and a departure axis which is substantially vertical;
- gripping the pipeline at a location upstream of said arcuate path and controlling the paying out of the pipeline under tension;
- joining new pipeline sections to the end of the pipeline on the fabrication axis upstream of said gripping location;

wherein the method further comprises:
- pre-assembling each new pipeline section from a plurality of the stored pipe units off said fabrication axis using a plurality of work stations arranged in at least one multi-stage production line; and
- transferring the assembled pipeline sections from the production line to the fabrication axis for joining to the pipeline being laid at said primary joining station.

The method may further include lining the assembled pipeline section with a continuous plastic liner prior to transferring it to the fabrication axis, the joining step including joining the pipeline section and its lining to the pipeline being laid and a lining thereof, respectively.

The pre-assembled pipeline sections may be greater than 90 m, even 135 m or 180 m in length. These lengths correspond to eight, twelve or sixteen pipe units of approximately 12 m each.

The pre-assembly may be performed using parallel first and second multi-stage production lines located off the fabrication axis, the transferring step transferring assembled pipeline sections alternately from said first and second production lines.

The fabrication axis may be positioned at a height of 10 m, 20 m or more above a main deck of the vessel, the transferring step including lifting the pre-assembled pipeline section from the level of said production line to the height of the fabrication axis.

The method may further include storing a plurality of pre-assembled pipeline sections in a buffer store parallel to the production line, prior to transferring them to the fabrication axis.

[Third Aspect]

According to a third aspect of the invention there is provided a pipelaying vessel comprising:
- storage for a number of pipe units to be assembled into a pipeline for laying; and
- S-lay apparatus for fabricating and paying out of a pipeline by repeated addition of new pipeline sections to the end of the pipeline being laid, the end of said pipeline being held aligned with a fabrication axis closer to horizontal than vertical, wherein the S-lay apparatus includes:
  - a first stinger for supporting the fabricated pipeline in an arcuate path between said fabrication axis and a departure axis which is substantially vertical;
  - a second stinger for supporting a second fabricated pipeline in a second arcuate path, said second arcuate path running in a direction opposite to that of the first-mentioned arcuate path to a second departure axis which is substantially vertical but distant from the first departure axis; and
  - means located on the fabrication axis between the two stingers for joining the first and second fabricated pipelines.

Optional features of the invention in this aspect have been described above in relation to the first and second aspects of the invention.

The third aspect of the invention further provides a method of fabricating and laying pipeline at sea, comprising:
- storing a number of pipe units to be assembled into a pipeline for laying;
- fabricating and paying out a first pipeline by repeated addition of new pipeline sections to the end of the pipeline being laid, the end of said pipeline being held aligned with a fabrication axis closer to horizontal than vertical, the fabricated first pipeline being supported in a first arcuate path between said fabrication axis and a first departure axis which is substantially vertical;
- during an interruption in the fabrication of the first pipeline, fabricating and paying out a second pipeline, the second fabricated pipeline being supported in a second arcuate path to a second departure axis which is substantially vertical but distant from the first departure axis;
- joining the first and second fabricated pipelines; and
- paying out the joined pipelines over one of the first and second arcuate paths.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Background

Figure 1:
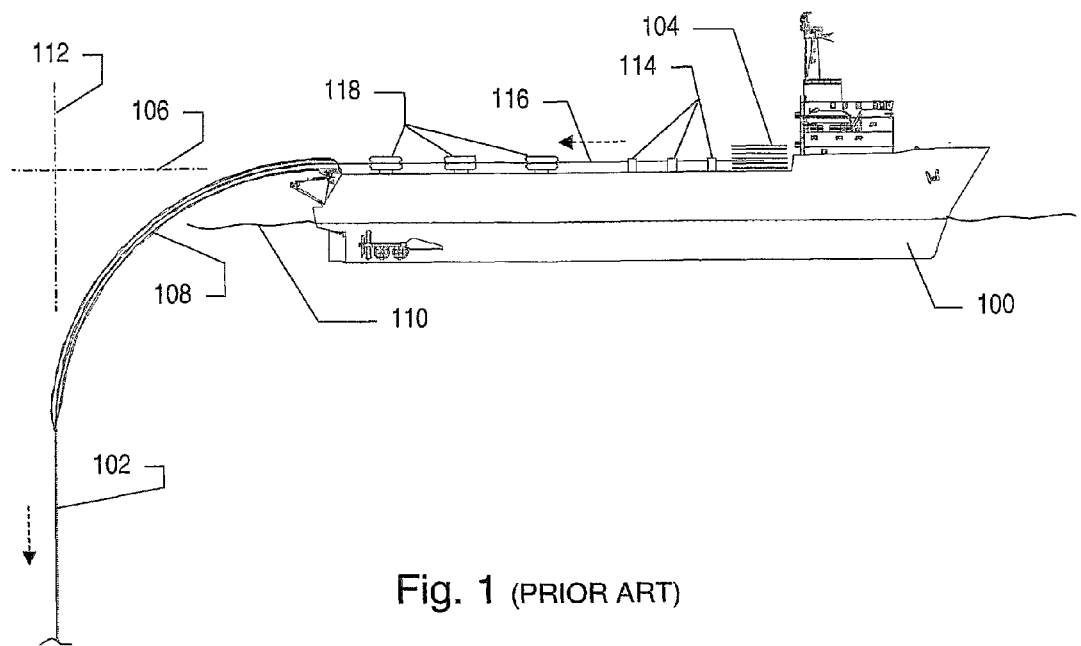
FIG. 1 shows schematically the form and function of a pipelaying vessel having a known 'Steep S-lay' type of pipelaying vessel.

FIG. 1 shows the principal components of a Steep S-lay system, including a vessel 100 and apparatus for fabricating and laying a pipeline 102 using a stalk of shorter pipe units 104 which may be 25 m meters in length. The pipeline is firstly fabricated along a horizontal axis 106 running along the deck of the vessel and then diverted by a radius controller or stinger 108, as it descends below the sea surface 110 along a departure axis 112. Depending on (i) the depth of water, (ii) properties of the pipeline and (iii) any forward tension maintained on it by thrusters of the vessel, the departure axis may be some degrees off vertical in a given situation.

Along the fabrication axis 106, the pipeline is fabricated at a series of joining stations 114, featuring welding and inspection facilities. The continuous pipeline then passes at 116 to a series of track-type tensioners 118 which support the weight of the pipeline 102 and control paying out of the pipeline in the directions shown by the dotted arrows. A degree of redundancy is provided by having three tensioners. At least two of these should be gripping the pipe at any given time, while the third one can open to allow Tee joints, anodes etc to pass along the fabrication axis 106.

The principle of Steep S-lay is such that the outer fibres of the pipe yield to a degree that produces a residual curvature in the laid pipe but only to the magnitude allowed by the manufacturing specification. In the example shown, the stinger 108 has a fixed radius of, for example, 70 m and might more accurately be referred to as a chute or radius controller. This is in contrast to a semi-floating stinger with variable buoyancy which would be used in a traditional S-lay system. The 70 m radius is designed to produce yielding of 20" API Grade X65 pipe at a lay tension of 400 t. Weaker pipes or higher lay tensions will be outside the specification for this radius, while smaller diameters will not be yielded at all.

As mentioned in the introduction, a system of the type shown in FIG. 1 is capable of rapid assembly and deployment of a pipeline, but loses its advantage in the case where Tees and other singularities must pass through the tensioners 118 and over the stinger 108. In particular, overboarding such singularities involves a delicate and time-consuming operation to support them above the stinger using cranes and like. Note also that the length of the tensioner section, which requires gaps between the tensioner sufficient for any accessory that might be passing, is at least as long as the fabrication area where the joining stations 114 are located. This limits the number of pipe units 104 which can be added to the pipe 116 in a parallel for a given length of working deck, and thus limits the lay rate.

Figure 2:
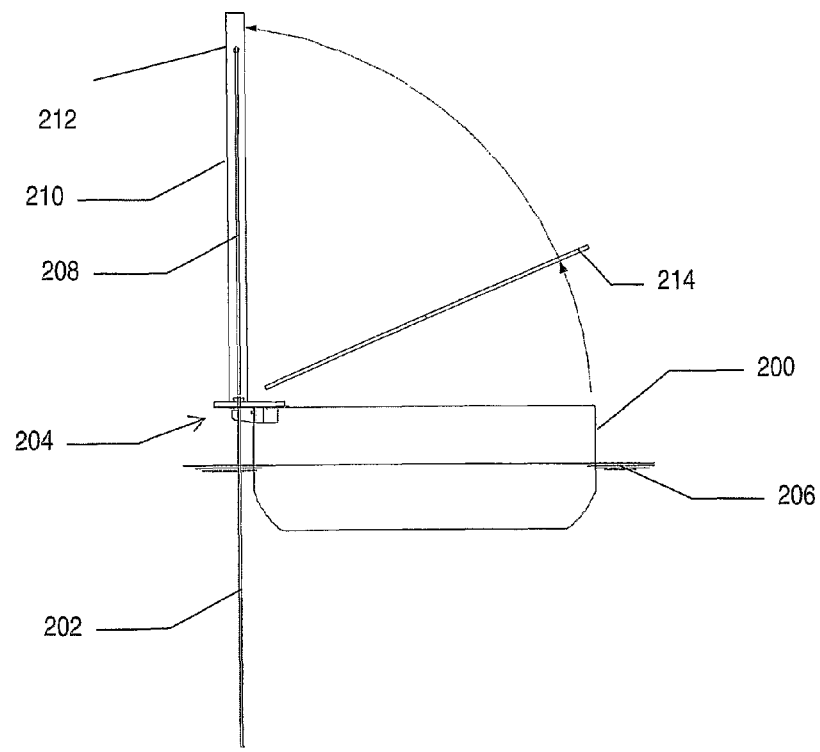
FIG. 2 shows schematically the form and function of a pipelaying vessel having a known 'J-lay' type of pipelaying apparatus.

FIG. 2 shows the basic components of a J-lay system, provided on a vessel 200, which might be a large semi-submersible for the largest systems. The suspended pipeline 202 is held by a fixed clamp arrangement in a working table 204 above the point where it descends below the sea surface 206. A new section of pipe 208, for example a double- or quad-joint (24 m or 48 m typical length) is supported in a vertical tower structure 210, to be welded to the top of the suspended pipeline just above the table 204. Each new section is supported at its upper end by a travelling block 212. Once the welding is complete, the hold-off clamp at the table 204 is opened and the travelling block 212 takes the weight of the entire pipeline 202, lowering it until the top of the added section is gripped again at the level of working table 204. A further new pipe section 214 is then elevated into the tower and this process repeated to add any number of sections to the pipe.

As the entire arrangement remains vertical (or at whatever angle is necessary for the tension in the pipe to be aligned with the departure axis, it is a relatively simple matter to add Tees, terminations and so forth, compared with the steep S-lay arrangement shown in FIG. 1. On the other hand, the overall lay rate achievable for continuous pipeline is not so great because paying out has to be interrupted for the complete duration of making and testing a welded joint.

Novel System

Figure 3:
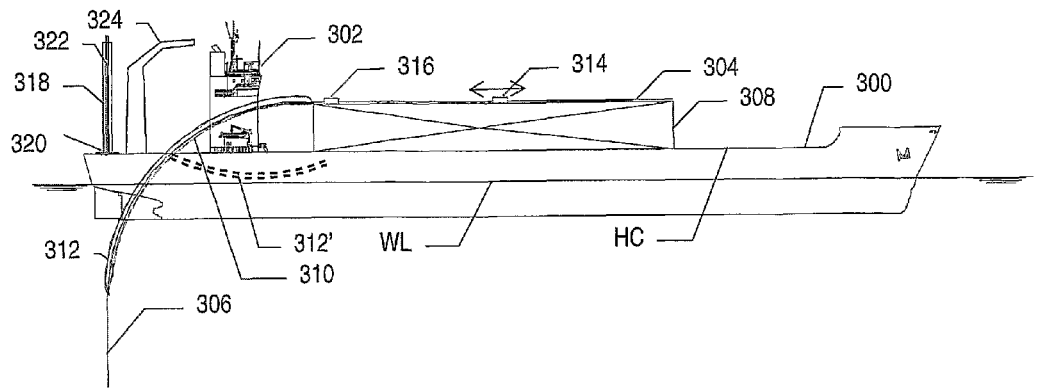
FIG. 3 shows a novel pipelaying vessel having both Steep S-lay and J-lay apparatuses arranged to co-operate in accordance with the first and second aspects of the present invention.

FIG. 3 shows a novel system in which both Steep S-lay and J-lay apparatuses are provided on a large container cargo vessel 300 of overall length 335 m. A superstructure 302 comprises the accommodation, bridge and so on. WL indicates the water line, while HC indicates the working deck level of the vessel, this being the hatch combing level of the container vessel, normally a little above the main deck. With regard to the S-lay apparatus, the fabrication line where a new pipe stalk 304 is added to the suspended pipeline 306 is mounted at an elevated position above the deck level HC, on the large supporting framework 308. The length of this framework is 200 m or 300 m. It is located to one side of the vessel, as will be explained with reference to FIG. 5 below. The radius controller or stinger is made in an upper part 310 and a lower part 312. Although it extends below the water line, this is to a lesser degree than in the example FIG. 1, due to the height of the supporting structure 308. The lower portion of the stinger can be folded forward for transit, as shown at 312'.

Figure 6:
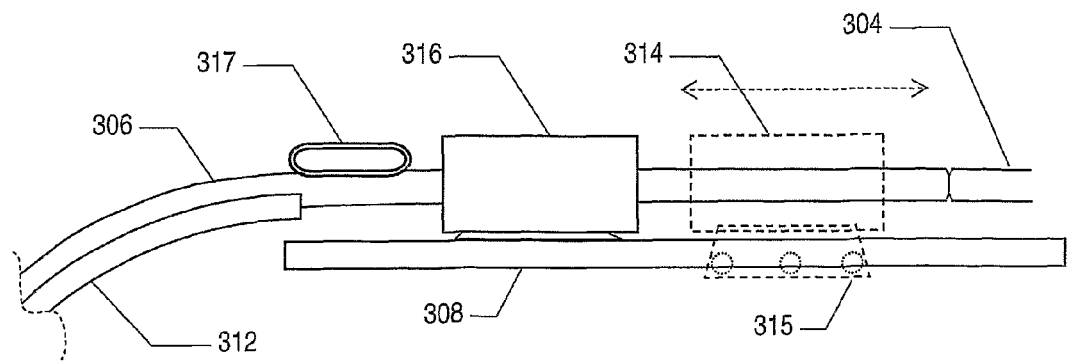
FIG. 6 shows schematically more detail the layout of equipment at the upper end of a stinger in the novel vessel.

Rather than a bank of tensioners for controlling paying out of pipeline 306, the S-lay apparatus in the present example uses a travelling clamp 314 which can traverse substantially the entire length of the supporting structure, supported on a carriage 315 (see FIG. 6). A suitable form of clamp and also a compressible rack system for driving the carriage under very high loads is described for example in our patent U.S. Pat. No. 6,551,027 (agent's ref. 63591US). Near the top of the stinger 310 there is located a fixed clamp 316 for supporting the end of the suspended pipeline 306 while the new section 304 is joined to the suspended pipeline 306.

FIG. 6 shows the layout of equipment in the vicinity of fixed clamp 316. Between clamp 316 and the top of the stinger 312 a reaction track 317 is provided to force the pipeline 306 onto the fabrication axis. In order to pay out the pipeline, it is a simple matter for the travelling clamp 314 to travel to the forward end of the frame 308, to grip the forward end of the added section 304 while the grip of the clamp at 316 is released and then to travel towards clamp 316, paying out a new section of pipeline over the stinger 310/312. In front of fixed clamp 316, sufficient space is provided between the fixed clamp and the joining station so that the travelling clamp can deliver the end of the assembled pipeline to an appropriate position, ready for the addition of a further section 304.

In addition to the Steep S-lay apparatus just described, the novel vessel is further provided with J-lay apparatus, represented schematically by tower 318 and table 320. The J-lay tower 318 is not provided for operation only independently of the S-lay system, however, but is specifically arranged with its axis more or less aligned with the departure axis of the Steep S-lay system. In this way, a new stalk of pipe or other accessory can be added to the pipeline 306 by interrupting the S-lay operation and transferring the weight of the suspended pipeline 306 to the J-lay apparatus. These operations will be described in more detail below. A crane 324 is available to assist in the transfer of load from one system to the other and of course, the skilled person will appreciate that various winches, sheaves and other ancillary equipment are provided to support the basic operations described herein.

Before describing the plan view and the methods of operation of the novel vessel in more detail, a second embodiment shown in FIG. 4 will be described.

Figure 4:
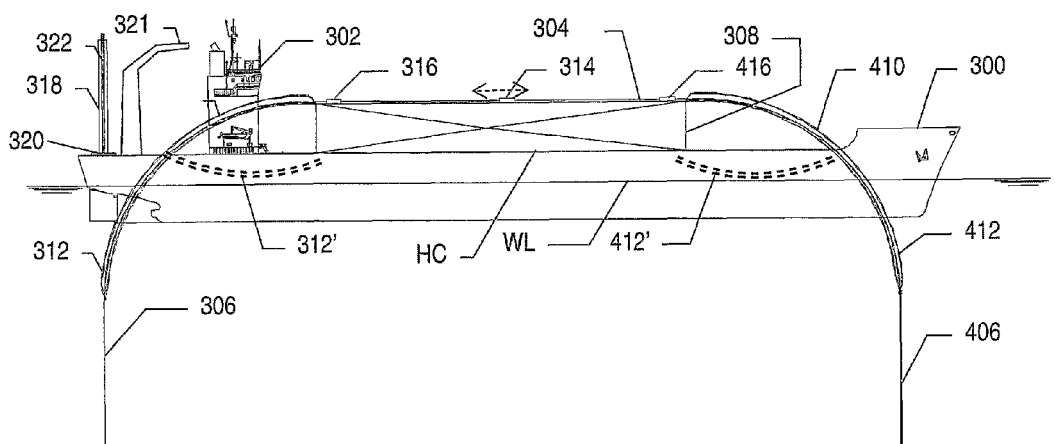
FIG. 4 shows the novel vessel modified by the addition of a second stinger so as to implement the first, second and third aspects of the present invention.

FIG. 4 shows the second embodiment of the vessel, which has all of the same components of the first embodiment, which are indicated by the same reference signs. In addition, however, the Steep S-lay apparatus is augmented by a second stinger extending forward of the supporting structure 308. The second stinger comprises upper and lower portions 410 and 412, respectively. Again, the lower portion can swing from its operating position down below the water line WL, to a stowed position indicated at 412'. At the forward end of the fabrication area on top of the structure 308, a second joining station and fixed clamp 416 are provided. The travelling clamp at 314 and its drive arrangement are further adapted to support tension in the pipeline 304, whether it is hanging from the rear stinger as at 306, or from the second, forward stinger as shown at 406.

Figure 5:
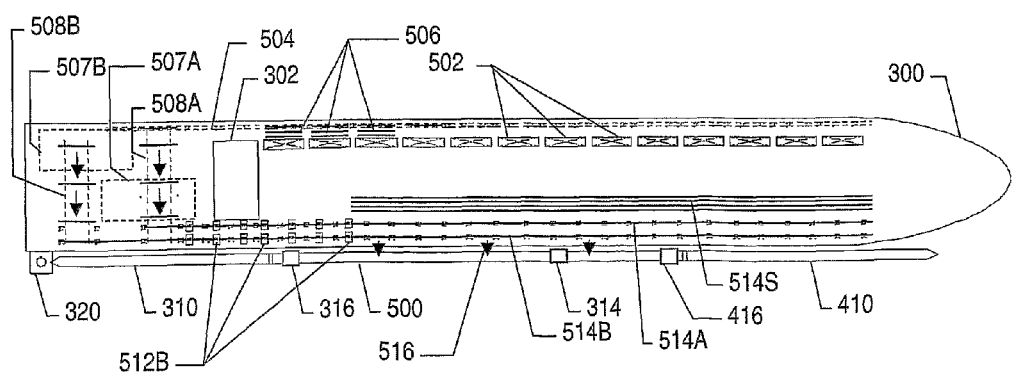
FIG. 5 is a plan view showing the arrangement of the various apparatuses on the vessel of FIGS. 3 and 4.

FIG. 5 is a plan view of the vessel 300 shown in FIG. 4, this shows how the rear and forward stingers 310 and 410 and the J-lay table 320 and tower 318 are all located just outboard of the main hull, to the starboard side of the vessel. The supporting structure 308 is omitted for clarity. However, a runway 500 is shown extending between the two stingers and the fixed clamps 316 and 416, in the region of the main fabrication access of the S-lay apparatus. Apart from facilitating the addition of these apparatuses to an existing container ship, locating the apparatus to one side of the deck allows a substantially normal degree of access to container cargo hold hatches, which are arrayed along and across the deck of the vessel, while the vessel is loaded at port. Along the port side, containers 502 can be raised to deck level and a conveyor system 504 is provided to receive pipe units 506 from containers retrieved from the hold at any point along the port deck to pipe preparation areas 507A and 507B located astern of the super structure 302. Transverse conveyors 508A and 508B carry pipe sections through the preparation areas 507A and 507B to feed a pipeline factory having two independent, multi-stage production lines (distinguished by suffixes A and B).

Figure 7:
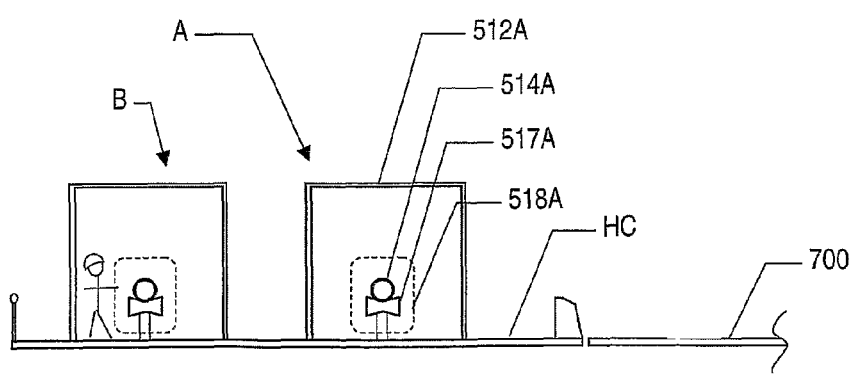
FIG. 7 is a cross-sectional view showing the layout of two pipeline productions lines in the novel vessel.

FIG. 7 shows the layout two production lines A and B in a little more detail, in a transverse section looking toward the stern along the working deck HC. A section of hatch cover 700 is also shown. Within the pipeline factory, each production line A and B comprises a series of work stations 512A/B which are all capable of working in parallel to join a number of pipe units into a long pipe stalk. As is well-known, in a multi-stage pipe factory of this type, each station performs a specific stage of a complete joining operation, such as weld root pass, weld filling, weld capping, weld testing and (optionally) repair, coating and so on. The pipeline travels between stages supported on rollers 517A/B, the equipment appropriate to each task being indicated at 518A/B.

In conventional S-lay apparatuses, the multi-stage production line itself defines the fabrication axis of the pipeline, and directly feeds the stinger. In the novel S-lay apparatus, however, the pipeline factory is located off the main fabrication axis and so very long pipe stalks 514A and 514B can be grown and conveyed to lie parallel with the track 500, independently of the operation of operations on the fabrication axis.

Whichever stalk 514A or 514B is ready at a given time can be lifted and transferred finally onto the main fabrication access of the Steep S-lay system by elevator 516, and joined to the end of suspended pipeline 306 or 406 respectively. The added section can then be gripped by the travelling clamp 314 and paid out ready for the addition of a new section. Production can also continue while S-lay operations are interrupted, by providing a space for buffer storage of completed stalks 514S.

In the example shown, each stalk 514A or 514B is sixteen pipe units long, approaching 200 m in length. Pipe units are typically around 12 m long, although between jobs they vary from 11.6 m to 12.8 m, typically 12.4 m. A very high lay rate can be achieved in this way, by parallel operation of the production lines A and B. If the track 500 were only 100 m long, then one production line would probably be sufficient to keep up, but the lay rate would be almost halved. Moreover, while stalk 514A (for example) is being added to the suspended pipeline, stalk 514B can be being lined with a plastic liner, the liner subsequently being joined to a liner of the suspended pipeline 306 or 406, as the case may be. Techniques for joining lined pipes are disclosed for example in WO 2004/015321A (Stolt Offshore SA), mentioned in the introduction. As the length of stalk 514A/B can be over 200 m, lining and joining during fabrication and laying of a pipeline offshore becomes economically feasible in a way it was not with traditional S-lay or J-lay apparatuses.

Co-operation of J-Lay and S-lay Apparatuses

It goes without saying that the Steep S-lay and J-lay apparatuses provided on the vessel of FIG. 3 or FIG. 4 can each operate independently to perform the operations normally associate with such apparatus. These will not be gone into in further detail, rather the following description explains how, because of the particular juxtaposition of those apparatuses in the novel vessel, they may actually co-operate in the laying of a single pipeline to achieve a far greater range of operations with a far greater efficiency than either system operating alone.

One key problem limitation of the S-lay process is the delay arising when a Tee or other in-line module or an end termination is to be added to the pipeline being laid. This process is accelerated and the risk of damage reduced by swapping the pipeline 306 to the J-lay apparatus for the insertion of such accessories or modules. The sequence for this may be as follows:

A rope or wire is led from the J-lay system to the upper end of the pipe 306 on the stinger (the pipe is at this point held in the clamp 316.

The upper end of the pipe is paid out on a rope or wire led from the moving clamp 314 (or a winch if tensioners are provided instead of the travelling clamp) until the rope from the J-lay system becomes tight and takes all the load.

The bottom part 312 of the stinger is then hinged forward to move the end of the stinger out of the way of the accessory that is to be installed. It does not need to move all the way to the stowed position 312', of course.

The singularity is welded to the suspended pipeline and one or more additional pipe sections 322 added using the J-lay apparatus, paying out the pipeline and accessory in the process.

Assuming the accessory in question is an in-line fitting and not an end termination, the reverse transfer process is then effected by supporting the pipeline on a rope from the J-lay system, attaching and leading a rope from the end of the pipeline 306 up stinger 310/312 to the travelling clamp 314, taking up the load and drawing the pipe up the stinger into the fixed clamp at workstation 316 by driving the travelling clamp 314 forward along the S-lay track 500.

Production by the S-lay apparatus can then continue at full speed.

The transfer between S-lay and J-lay modes is greatly facilitated by having because the J-lay tower is substantially aligned with the top of the catenary and must therefore be as close as practically achievable to being tangential to the pipe departure from the stinger. In practice it will be parallel to the tangent and at some minimum practical offset. In another embodiment, one could envisage the J-lay tower axis being offset some distance from the stinger. The equipment for effecting the transfer of load between the J-lay and S-lay apparatuses would be more complex in that case, however, for example involving the clamp of the J-lay system take over supporting the pipe at a position away from the tower, and then moving under the tower on its own carriage. This facility allows the bulk of a pipeline to be rapidly laid by the S-lay system and Tees and end fittings, which can not pass over the stinger, to be installed by the J-lay system.

It will be appreciated that, in the single-stinger embodiment of FIG. 3, pipeline production in the Steep S-lay apparatus must be put on hold while pipeline 306 is being handled in the J-lay apparatus (at least once stalks 514A and 514B have been completed. The embodiment of FIGS. 4 and 5, however, has a stinger at each end. This allows the normal direction of pipelay to be reversed so that production of pipeline 406 can continue to the extent of the water depth during the time taken to fit end fittings or midline tees to the catenary, which is held in the J-lay system. Once the end of pipeline 306 is safely back in the clamp at workstation 316, the end of pipeline 406 can be brought up to meet it and the two joined together (or both can be joined to opposite ends of a new stalk 514A or 514B using work stations 316 and 416). The whole combination can then be paid out over the stern stinger 310/312 without pausing to add new sections 514A/514B until the entire pipeline 406 has been drawn in over forward stinger 410/412 from where it was hanging in the water.

The forward stinger 410/412 can of course be used for Steep S-lay operations in its own right, if the job is more conveniently done from the forward end of the vessel. Note that there is no requirement for the second stinger to be as large as the first stinger. It may be sufficient to provide a smaller stinger and restrict its use to smaller pipe to avoid plastic deformation. Alternatively, plastic deformation may be deliberately imparted to the pipe as it enters and leaves the stinger, to control the behaviour of the suspended pipe.

Alternative Embodiment

Figure 8:
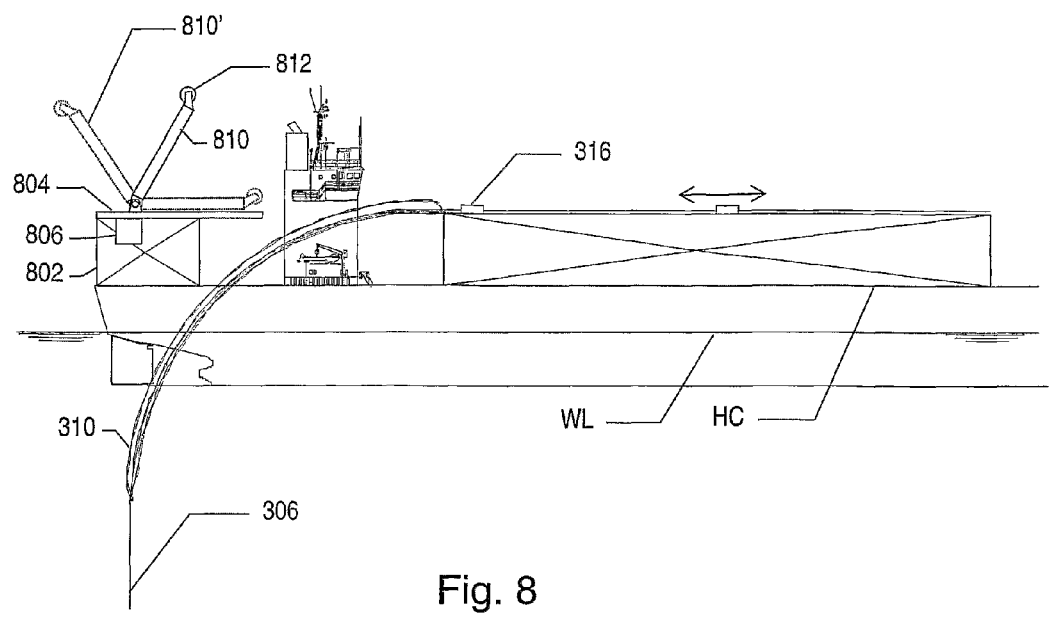
FIG. 8 shows part of a second novel vessel having Steep S-lay apparatus and PLET-handling apparatus arranged to co-operate in accordance with the first and second aspects of the invention.
Figure 9A:
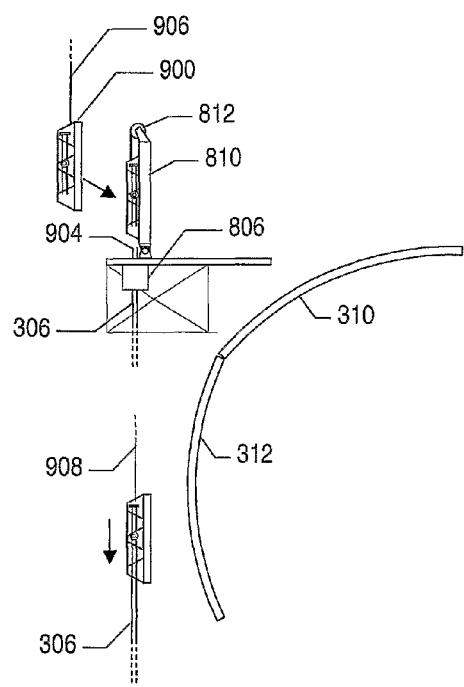
FIG. 9a illustrates the operation of the apparatus of FIG. 8 to add a terminating module (PLET) to the end of a pipeline laid by the S-lay apparatus.
Figure 9B:
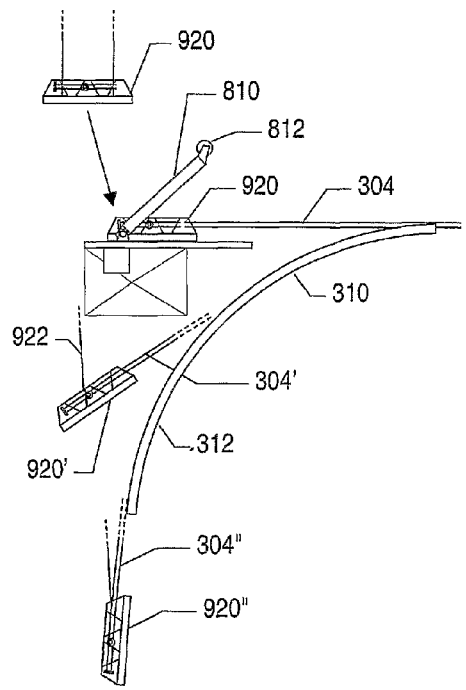
FIG. 9b illustrates the operation of the apparatus of FIG. 8 to add a terminating module (PLET) to the beginning of a pipeline to be laid by the S-lay apparatus.

FIGS. 8, 9a and 9b illustrate an alternative embodiment in which end terminations (PLETs) can be fitted to the S-lay pipeline without use of a complete J-lay apparatus. This may be useful on a vessel where the J-lay apparatus as such is not necessary, or where it is more convenient to locate it away from the S-lay apparatus stinger. In FIG. 8 no J-lay apparatus is shown, and crane 324 is omitted for clarity, but these features can be provided as desired.

In this alternative embodiment, auxiliary apparatus in the form of a PLET handling system is mounted on a supporting structure 802 directly above the lower section 312 of the stinger and generally aligned with the departure axis of the pipeline 306. PLET handling system includes a working platform 804, a hold-off clamp 306 and movable support structure 810. Structure 810 is of a well-known A-frame construction and comprises two legs pivotally mounted to the fixed structure 802 and joined by a cross-beam for supporting loads via sheave 812. Using associated winches (not shown), the structures 802-812 can support any of the loads required to handle PLETs and other singular items, as well as the entire weight of the suspended pipeline. Structure 810 can pivot inboard and outboard of the departure axis, including under load, as shown at 810/810'. It can also lie down for storage and for horizontal operations.

FIG. 9a shows the auxiliary apparatus in use to add an end termination module or first PLET 900 to the end of pipeline 306 already laid by the S-lay system. Using a wire led from the sheave 812, the A-frame 810 has previously been used to transfer the suspended pipeline 306 from the stinger to the hold-off clamp 806, with its end 904 projecting so as to be accessible to workers on platform 804. The lower part 312 of the stinger has been folded away from the pipeline. With a wire 906 from crane 324 PLET 900 is loaded into the A-frame 810 and aligned with the end 904 of pipeline 306, as shown at 900'. After welding the PLET to the pipeline end, the two are lowered as shown at 900", using a wire 908 led from the sheave 312. Because this is the end of the pipeline after fabrication, there is no need to transfer the load back onto the stinger.

Because the auxiliary apparatus is located substantially on an extension of the departure axis of the S-lay apparatus, hand-over of the load is straightforward. The auxiliary apparatus in this example is also located substantially on an extension of the fabrication axis of the S-lay apparatus (horizontal in this case). This additional feature facilitates the handing of load from the auxiliary apparatus to the S-lay apparatus. Note that the fixed supporting structure 800 is fixed when in use. That is not to say that it could not be made movable, collapsible or removable when not in use.

FIG. 9b illustrates the complementary operation, in which an initiating end termination module, second PLET 920, is being added to the beginning of a pipeline which is about to be fabricated and laid using the S-lay apparatus of the vessel. Pipeline section 304 has been fed through fixed clamp 316 to project into the working area of auxiliary apparatus, just above platform 804. PLET 920 is lowered by the crane into a horizontal position on the platform 804, where it can be joined to the end of pipeline section 304. A-frame 810 is then pivoted outboard (for example to the position shown as 810' in FIG. 8) sheave 812 is used with a wire 922 to support the module as it is gradually lowered through positions 920' and 920". A deadweight may be added to assist in controlling the assembly. At the same time, pipeline section 304 is gradually paid out so that it bends into positions 304' and 304" to rest on the stinger, with the PLET 920 safely clear of the stinger. The pipe section 304 then becomes the first section of a suspended pipeline 306 for the normal S-lay fabrication and laying process to commence.

Containerised Storage

In addition to the above advantages, benefit can be derived from the fact that vessel as is based on a container ship design, modified to accept the pipelay systems, wherein the container holds are fitted with overhead travelling cranes and elevators to deliver containers holding lengths of pipe to the deck for unloading. Although conventional 40-foot containers are too short to carry 12.4 m pipe units comfortably, there is a newer 45-foot standard container which can be adapted to this purpose. A fore-runner of this storage system is disclosed in GB 2324078A and used successfully on the applicant's vessel Seaway Falcon. The known system uses custom-sized skips to support the pipes in the hold and during handling. The cargo carrying capacity of the novel ship should be able to accommodate sufficient pipe that an entire season's work on any deep water project currently known or conceived. This corresponds for the sake of argument to at least 30,000 t of steel pipe plus the self weight of the containers in which it is delivered. Being a standard cargo vessel in its hull form, it should be able to transit at high speed, say 25 knots or more, so as to allow a single transhipment base for the Atlantic and Mediterranean region.

The invention claimed is:

1. A pipelaying vessel comprising:
   storage for a number of pipe units to be assembled into a pipeline for laying;
   S-lay apparatus for fabricating and paying out of a pipeline by repeated addition of new pipeline sections to the end of the pipeline being laid, the end of said pipeline being held aligned with a fabrication axis closer to horizontal than vertical, the S-lay apparatus including a stinger for supporting the fabricated pipeline in an arcuate path between said fabrication axis and a departure axis which is substantially vertical; and
   auxiliary apparatus for use in fitting singular items to at least one end of the pipeline and including a supporting structure for supporting said items while they are connected to the pipeline at a location above a lower end of the stinger of the S-lay apparatus, substantially aligned with said departure axis, so as to facilitate handing over of the suspended pipeline and singular item from one of said apparatuses to the other.

2. A vessel as claimed in claim 1, in which the auxiliary apparatus includes a hold-off clamp located on said supporting structure above the stinger and aligned with said departure axis.

3. A vessel as claimed in claim 2 wherein said hold-off clamp is arranged for holding an upper end of a pipeline already laid, and including a module-handling apparatus above the hold-off clamp for supporting an end termination module in vertical alignment with the end of the pipeline while the pipeline and module are joined.

4. A vessel as claimed in claim 3 wherein the module-handling apparatus includes a fixed supporting structure and an A-frame structure pivotally mounted to said fixed structure, the A-frame structure providing a support which is movable fore and aft across the departure axis while supporting the weight of said module and pipeline.

5. A vessel as claimed in claim 3 wherein said module-handling apparatus is further located substantially at the intersection of the departure axis and fabrication axis of the S-lay system, and includes a structure for supporting a second end termination module in relatively horizontal alignment with the end of a pipeline being fabricated while the said module and pipeline are joined.

6. A vessel as claimed in claim 1, in which the stinger has an upper side free of structural members to enable the pipeline to be removed from and replaced in the stinger when being transferred to and from the auxiliary apparatus.

7. A vessel as claimed in claim 1 further comprising:
   J-lay apparatus for fabricating and paying out of a pipeline by repeated addition of new pipeline sections to the end of the pipeline being laid, the end of said pipeline in operation being held at a lower end of the J-lay apparatus and having a departure angle aligned with a substantially vertical axis of the J-lay apparatus; and
   means for handing the suspended pipeline over from one of said apparatus to the other such that different parts of the same pipeline can be fabricated by the different J-lay and S-lay apparatuses.

8. A vessel as claimed in claim 7 wherein the J-lay apparatus and said S-lay apparatus are mounted on the vessel such that the stinger is within the length of the vessel and the departure axis of the S-lay system and the axis of the J-lay apparatus are substantially aligned, the J-lay apparatus thus forming said auxiliary apparatus.

9. A vessel as claimed in claim 7 wherein the hand-over means is adapted for translating the end of the suspended pipeline between the axis of the J-lay apparatus and the departure axis of the S-lay apparatus.

10. A vessel as claimed in claim 7, wherein the J-lay apparatus comprises:
    means for suspending a pipeline being laid with a substantially vertical departure angle;
    means for erecting and holding a new pipeline section in alignment with the suspended pipeline;
    means for joining the erected pipeline section to the suspended pipeline so as to extend the pipeline being laid; and
    means for lowering the extended pipeline to be held in said suspending means ready for addition of a further pipeline section.

11. A vessel as claimed in claim 10 wherein the J-lay apparatus comprises a tower structure aligned with the axis, a working table located at the foot of said tower and an erector for receiving a pipeline section to be added to the pipeline and supporting the pipeline section while moving it from a horizontal receiving position to a vertical position within the tower.

12. A vessel as claimed in claim 10 wherein the J-lay apparatus further includes a production line for assembling said new pipeline section from shorter pipe units held in said storage, prior to erecting them in the J-lay apparatus.

13. A vessel as claimed in claim 1 wherein the S-lay apparatus comprises, in addition to the stinger:
    tensioning means aligned with said fabrication axis upstream of the stinger for gripping and controlling the paying out of the pipeline under tension;
    one or more joining stations positioned along the fabrication axis upstream of the tensioning means for joining new sections of pipe to the end of the pipeline held in the tensioning means.

14. A vessel as claimed in claim 13 wherein the apparatus further includes a substantially fixed clamp positioned on the fabrication axis between the stinger and a primary joining station, for holding the end of the pipeline while the new pipeline section is added to the pipeline, the tensioning means being located upstream of the primary joining station, for paying out the pipeline by gripping the newly added pipeline section.

15. A vessel as claimed in claim 13 wherein the tensioning means comprises at least one traveling clamp mounted on a carriage and means for driving the carriage along the fabrication axis while gripping the pipeline.

16. A vessel as claimed in claim 1 wherein the S-lay apparatus comprises a pipeline factory located off said fabrication axis, the pipeline factory having a plurality of work stations arranged in at least one multi-stage production line for pre-assembling pipeline sections from shorter units held in said storage, and means for transferring the assembled pipeline sections from the production line to the fabrication axis for joining to the pipeline being laid.

17. A vessel as claimed in claim 16 wherein the S-lay apparatus further includes means for lining the assembled pipeline section with a continuous plastic liner, the joining station being adapted for joining the pipeline section and its lining to the pipeline being laid and a lining thereof, respectively.

18. A vessel as claimed in claim 16 wherein the pipeline factory is adapted to form pipeline sections greater than 90 m long.

19. A vessel as claimed in claim 16 wherein the pipeline factory is adapted to form pipeline sections by joining eight or more of said pipe units.

20. A vessel as claimed in claim 16 wherein the pipeline factory further comprises a second multi-stage production line, also located off said fabrication axis, said transferring means being operable to transfer assembled pipeline sections alternately from said first and second production lines to achieve a greater rate of laying than would be achievable by the first pipeline section factory alone.

21. A vessel as claimed in claim 16 wherein the transferring means includes an elevator for lifting the fabricated pipeline section from the level of said production line to the height of the fabrication axis.

22. A vessel as claimed in claim 1 wherein the S-lay apparatus is positioned with its fabrication axis outboard along one side of the vessel.

23. A vessel as claimed in claim 1 wherein the S-lay apparatus is positioned with its fabrication axis at a height of 10 m or more above a main deck of the vessel.

24. A vessel as claimed in claim 1 wherein a lower part of the stinger is foldable upward when not in use.

25. A vessel as claimed in claim 1 wherein the S-lay apparatus further comprises a second stinger for supporting a second portion of fabricated pipeline in a second arcuate path, said second arcuate path running in a direction opposite to that of the first-mentioned arcuate path to a second departure axis which is substantially vertical but distant from the first departure axis.

26. A vessel as claimed in claim 25 wherein the S-lay apparatus comprises a substantially fixed clamp located on the fabrication axis close to the second stinger for holding an end of the second fabricated pipeline in alignment with the fabrication axis while the remainder of the second fabricated pipeline extends over the second stinger.

27. A vessel as claimed in claim 25 wherein the S-lay apparatus comprises an additional joining station located on the fabrication axis closer to the second stinger than to the first stinger, for joining a new pipeline section to the end of the second fabricated pipeline while the remainder of the second fabricated pipeline extends over the second stinger.

28. A vessel as claimed in claim 25 wherein the S-lay apparatus includes tensioning means in the form of at least one traveling clamp mounted on a carriage and means for driving the carriage along the fabrication axis between the first and second stingers, and wherein the traveling clamp is operable for gripping and controlling paying out of a pipeline section along either of the first and second arcuate paths.

29. A vessel as claimed in claim 25 wherein a lower part of the second stinger is foldable upward when not in use.

30. A vessel as claimed in claim 1 wherein the storage comprises a containerised hold of the vessel.

31. A vessel as claimed in claim 30 wherein the vessel is a container carrier of at least 6000 TEU cargo capacity, where TEU is the standard measure Twenty-foot Equivalent Units.

32. A vessel as claimed in claim 1 wherein the vessel is at least 200 m length overall.

33. A method of fabricating and laying a pipeline from a vessel at sea, the method comprising the steps:
  (a) storing on the vessel pipe units to be assembled into a pipeline for laying;
  (b) fabricating and paying out a J-lay part of a pipeline by addition of one or more new pipeline sections to the end of the pipeline being laid, the end of said pipeline in this step being held at a lower end of a J-lay apparatus mounted on the vessel and having a departure angle aligned with a substantially vertical axis of the J-lay apparatus;
  (c) before or after step (b), fabricating and paying out an S-lay part of the same pipeline by repeated addition of new pipeline sections to the end of the pipeline being laid, the end of said pipeline in this step being held in an S-lay apparatus also mounted on the vessel and aligned with a fabrication axis closer to horizontal than vertical, the fabricated pipeline being supported by a stinger of the S-lay apparatus over an arcuate path between said fabrication axis and a departure axis which is substantially vertical; and
  (d) handing the suspended pipeline over from one of said apparatus to the other for fabrication of the different parts of the pipeline.

34. A method as claimed in claim 33 wherein the S-lay part of the pipeline comprises a flowline laid to lie completely on the seabed, while the J-lay part forms a riser extending from the seabed toward the surface.

35. A method as claimed in claim 33 wherein the S-lay part of the pipeline comprises a continuous pipeline while the J-lay part includes singular features.

36. A method as claimed in claim 33 further comprising fabricating a new pipeline section for addition to the J-lay part of the pipeline in step (b) by joining together two or more of said pipe units from the storage.

37. A method as claimed in claim 33 further comprising fabricating a new pipeline section for addition to the S-lay part of the pipeline in step (c) by joining together two or more of said pipe units from the storage.

38. A method as claimed in claim 37 wherein the fabrication of the new section is performed using a first production line while a previous new section fabricated on a second, parallel production line is being joined to the pipeline in step (c).

39. A method as claimed in claim 33 wherein the new sections added in step (c) are more than three times the length of the section(s) added in step (b).

40. A method as claimed in claim 33 further including inserting a plastic lining into each new pipeline section prior to its being added, step (c) including joining the lining of the new section to a lining within the pipeline being laid.

41. A method as claimed in claim 33 further including the step (e) of fabricating and paying out into the sea a second pipeline by repeated addition of new pipeline sections to the end of the second pipeline, the end of said pipeline in this step being held in the S-lay apparatus and aligned with the fabrication axis, the second pipeline being supported by a second stinger over a second arcuate path between said fabrication axis and a departure axis which is substantially vertical so as to be paid out in the opposite direction from the first mentioned pipeline.

42. A method as claimed in claim 41 wherein the step (e) is performed simultaneously with step (b) so as to build up a stalk of fabricated pipeline hanging from the second stinger, the second pipeline being joined to the first-mentioned pipeline after transferring the first-mentioned pipeline back into the S-lay apparatus and paid out over the first-mentioned stinger prior to resuming step (c).

43. A method as claimed in claim 33 wherein the storing step more than a thousand pipe units are stored in containerised storage.

44. A method of fabricating and laying a pipeline from a vessel at sea, the method comprising the steps:
   (a) storing on the vessel pipe units to be assembled into a pipeline for laying;
   (b) fabricating and paying out an S-lay part of the same pipeline by repeated addition of new pipeline sections to the end of the pipeline being laid, the end of said pipeline in this step being held in an S-lay apparatus also mounted on the vessel and aligned with a fabrication axis closer to horizontal than vertical, the fabricated pipeline being supported by a stinger of the S-lay apparatus over an arcuate path between said fabrication axis and a departure axis which is substantially vertical;
   (c) handing the suspended pipeline over from said S-lay apparatus to a hold-off clamp mounted in a supporting structure above a lower end of the stinger of the S-lay apparatus, the hold-off clamp being substantially aligned with said departure axis;
   (d) fitting a terminating module to the upper end of the pipeline using said supporting structure for supporting said module while it is connected to the pipeline held in said hold-off clamp; and
   (e) abandoning the connected pipeline and module by paying them out substantially vertically from said supporting structure.

45. A method of fabricating and laying a pipeline from a vessel at sea, the method comprising the steps:
   (a) storing on the vessel pipe units to be assembled into a pipeline for laying;
   (b) feeding the end of a first pipeline section, from an S-lay apparatus also mounted on the vessel and aligned with a fabrication axis closer to horizontal than vertical, to a location where a terminating module is supported by supporting structure above a lower end of the stinger of the S-lay apparatus, the module being substantially aligned with said fabrication axis;
   (c) connecting the terminating module to the end of the pipeline section;
   (d) lowering the connected terminating module from the supporting structure while paying out the pipeline until the terminating module passes clear of a stinger of the S-lay apparatus, the stinger being adapted to support the fabricated pipeline over an arcuate path between said fabrication axis and a departure axis which is substantially vertical;
   (e) fabricating and paying out an S-lay part of the same pipeline by repeated addition of new pipeline sections to the end of the pipeline being laid, the end of said pipeline in this step being held in the S-lay apparatus and the fabricated pipeline being supported by said stinger of the S-lay apparatus.

46. A pipelaying vessel including apparatus for fabrication and paying out of a pipeline being laid, the apparatus having a fabrication axis extending substantially horizontally along the vessel, comprising:
   storage for a number of pipe units to be assembled into a pipeline for laying;
   a stinger for supporting the pipeline in an arcuate path between the fabrication axis and a departure axis which is significantly inclined relative to horizontal;
   tensioning means positioned around the fabrication axis upstream of the stinger, for gripping and controlling the paying out of the pipeline under tension;
   a primary joining station positioned on the fabrication axis upstream of the tensioning means for joining new pipeline sections to the end of the pipeline held in the tensioning means;
   a pipeline factory located off said fabrication axis, the pipeline factory having a plurality of work stations arranged in at least one production line for pre-assembling pipeline sections from shorter units held in said storage; the pipeline factory extending over a major portion of the length of the vessel; and
   means for transferring the assembled pipeline sections from the production line to the fabrication axis for joining to the pipeline being laid at said primary joining station.
   wherein said pipeline factory, transferring means and fabricating apparatus are adapted respectively to assemble, transfer and receive pipeline sections longer than half the overall length of the vessel.

47. A pipelaying vessel as claimed in claim 46, in which the departure axis is inclined to the horizontal by more than 45°.

48. A vessel as claimed in claim 46 wherein the apparatus further includes a substantially fixed clamp positioned on the fabrication axis between the stinger and the primary joining station, for holding the end of the pipeline while the new pipeline section is added to the pipeline, the tensioning means being located upstream of the primary joining station, for paying out the pipeline by gripping the newly added pipeline section.

49. A vessel as claimed in claim 46 wherein the tensioning means comprises at least one traveling clamp mounted on a carriage and means for driving the carriage along the fabrication axis while gripping the pipeline.

50. A vessel as claimed in claim 46 wherein the apparatus further includes means for lining each assembled pipeline section with a continuous plastic liner prior to joining the pipeline section to the pipeline, the primary joining station being adapted for joining the pipeline section and its lining to the pipeline being laid and a lining thereof, respectively.

51. A vessel as claimed in claim 46 wherein the pipeline factory is adapted to form pipeline sections greater than 90 m long.

52. A vessel as claimed in claim 46 wherein the pipeline factory further comprises a further plurality of work stations arranged in a second multi-stage production line, also located off said fabrication axis, said transferring means being operable to transfer assembled pipeline sections alternately from said first and second production lines to achieve a greater rate of laying than would be achievable by the first pipeline section production line alone.

53. A vessel as claimed in claim 46 wherein the apparatus is positioned with its fabrication axis outboard along one side of the vessel.

54. A vessel as claimed in claim 53, the vessel having an island superstructure toward the stern of the vessel; and including means for removing pipe units from storage adjacent the side of the vessel opposite the side at which the outboard fabrication axis is located, and transfer means aft of the superstructure for transferring said pipe units into the pipeline factory; the pipeline factory extending from said transfer means to a location adjacent the bow of the vessel.

55. A vessel as claimed in claim 46 wherein the apparatus is positioned with its fabrication axis at a height of 10 m or more above a main deck of the vessel.

56. A vessel as claimed in claim 55 wherein the transferring means includes an elevator for lifting the fabricated pipeline section from the level of said production line to the height of the fabrication axis.

57. A vessel as claimed in claim 46 wherein a lower part of the stinger is foldable upward when not in use.

58. A vessel as claimed in claim 57 wherein the apparatus comprises a substantially fixed clamp located on the fabrication axis close to the second stinger for holding an end of the second fabricated pipeline in alignment with the fabrication axis while the remainder of the second fabricated pipeline extends over the second stinger.

59. A vessel as claimed in claim 58 wherein the apparatus comprises a further joining station located on the fabrication axis closer to the second stinger than to the first stinger, for joining a new pipeline section to the end of the second fabricated pipeline while the remainder of the second fabricated pipeline extends over the second stinger.

60. A vessel as claimed in claim 46 wherein the apparatus further comprises a second stinger for supporting a second fabricated pipeline in a second arcuate path, said second arcuate path running in a direction opposite to that of the first-mentioned arcuate path to a second departure axis which is substantially vertical but distant from the first departure axis.

61. A vessel as claimed in claim 46 wherein the tensioning means comprises at least one traveling clamp mounted on a carriage and means for driving the carriage along the fabrication axis between the first and second stingers, the same clamp being operable for gripping and controlling paying out of a pipeline section along either of the first and second arcuate paths.

62. A vessel as claimed in claim 46 wherein a lower part of the second stinger is foldable upward when not in use.

63. A vessel as claimed in claim 46 wherein the storage comprises a containerised hold of the vessel and the vessel is at least 200 m length overall 64. A method of fabrication and paying out of a pipeline, the method comprising:
storing a number of pipe units to be assembled into a pipeline for laying;
supporting the pipeline in an arcuate path between the fabrication axis and a departure axis which is substantially vertical;
gripping the pipeline at a location upstream of said arcuate path and controlling the paying out of the pipeline under tension;
joining new pipeline sections to the end of the pipeline on the fabrication axis upstream of said gripping location;
wherein the method further comprises:
pre-assembling each new pipeline section from a plurality of the stored pipe units off said fabrication axis using a plurality of work stations arranged in at least one multi-stage production line; and
transferring the assembled pipeline sections from the production line to the fabrication axis for joining to the pipeline being laid at said primary joining station; and
wherein said assembled pipeline sections include sections longer than half the overall length of the vessel.

65. A method as claimed in claim 64 further including lining the assembled pipeline section with a continuous plastic liner prior to transferring it to the fabrication axis, the joining step including joining the pipeline section and its lining to the pipeline being laid and a lining thereof, respectively.

66. A method as claimed in claim 64 wherein the pre-assembled pipeline sections are greater than 90 m in length.

67. A method as claimed in claim 64 wherein each pipeline section is formed from at least eight of said pipe units.

68. A method as claimed in claim 64 wherein the pre-assembly is performed using parallel first and second multi-stage production lines located off the fabrication axis, the transferring step transferring assembled pipeline sections alternately from said first and second production lines.

69. A method as claimed in claim 64 wherein the fabrication axis is positioned at a height of 10 m or more above a main deck of the vessel, the transferring step including lifting the pre-assembled pipeline section from the level of said production line to the height of the fabrication axis.

70. A method as claimed in claim 64 further including storing a plurality of pre-assembled pipeline sections in a buffer store parallel to the production line, prior to transferring them to the fabrication axis.

71. A method as claimed in claim 64 wherein the step of gripping the pipeline at a location upstream of said arcuate path and controlling the paying out of the pipeline under tension is performed using a travelling clamp arranged to grip the newly joined pipe section at a point upstream from the joining station and to travel towards the joining station while gripping the pipe section.

72. A pipelaying vessel comprising:
storage for a number of pipe units to be assembled into a pipeline for laying; and
S-lay apparatus for fabricating and paying out of a pipeline by repeated addition of new pipeline sections to the end of the pipeline being laid, the end of said pipeline being held aligned with a fabrication axis closer to horizontal than vertical, wherein the S-lay apparatus includes:
a first stinger for supporting a first fabricated pipeline in an arcuate path between said fabrication axis and a departure axis which is substantially vertical;
a second stinger for supporting a second fabricated pipeline in a second arcuate path, said second arcuate path running in a direction opposite to that of the first-mentioned arcuate path to a second departure axis which is substantially vertical but distant from the first departure axis; and
means located on the fabrication axis between the two stingers for joining the first and second fabricated pipelines.

73. A method of fabricating and laying pipeline at sea, comprising:
storing a number of pipe units to be assembled into a pipeline for laying;
fabricating and paying out a first pipeline by repeated addition of new pipeline sections to the end of the pipeline being laid, the end of said pipeline being held aligned with a fabrication axis closer to horizontal than vertical, the fabricated first pipeline being supported in a first arcuate path between said fabrication axis and a first departure axis which is substantially vertical;
during an interruption in the fabrication of the first pipeline, fabricating and paying out a second pipeline, the second fabricated pipeline being supported in a second arcuate path to a second departure axis which is substantially vertical but distant from the first departure axis;
joining the first and second fabricated pipelines; and
paying out the joined pipelines over one of the first and second arcuate paths.

* * * * *